United States Patent [19]

Hahn

[11] Patent Number: 5,262,187
[45] Date of Patent: Nov. 16, 1993

[54] LOW-FAT CEREAL-GRAIN FOOD COMPOSITION

[75] Inventor: Patricia W. Hahn, Plymouth, Minn.

[73] Assignee: The Pillsbury Company, Minneapolis, Minn.

[21] Appl. No.: 918,945

[22] Filed: Jul. 22, 1992

Related U.S. Application Data

[60] Continuation of Ser. No. 722,710, Jun. 28, 1991, abandoned, which is a division of Ser. No. 546,017, Jun. 28, 1990, abandoned.

[51] Int. Cl.$^5$ .................................................. A23L 1/10
[52] U.S. Cl. ......................................... 426/391; 426/496; 426/552; 426/554; 426/653; 426/804
[58] Field of Search ............... 426/391, 496, 552, 553, 426/554, 573, 653, 654, 804

[56] References Cited

U.S. PATENT DOCUMENTS

| | | | |
|---|---|---|---|
| 4,042,714 | 8/1977 | Torres | 426/553 |
| 4,103,038 | 7/1978 | Roberts | 426/601 |
| 4,219,580 | 8/1980 | Torres | 426/553 |
| 4,308,294 | 12/1981 | Rispoli et al. | 426/564 |
| 4,431,681 | 2/1984 | Hegedus et al. | 426/553 |
| 4,451,490 | 5/1984 | Silverman et al. | 426/553 |
| 4,503,083 | 3/1985 | Glicksman et al. | 426/553 |
| 4,526,799 | 7/1985 | Glicksman et al. | 426/553 |
| 4,528,203 | 7/1985 | Harris et al. | 426/555 |
| 4,668,519 | 5/1987 | Dartey et al. | 426/804 |
| 4,857,353 | 8/1989 | Jackson et al. | 426/554 |
| 5,073,399 | 12/1991 | Vassiliou | 426/573 |

FOREIGN PATENT DOCUMENTS 0340035 11/1989 European Pat. Off.

OTHER PUBLICATIONS

Pfizer, 1985, "Pfizer Polydextrose for the market that's shaping up" Pfizer, Inc, New York, N.Y. pp. 5 & 6.
Kelco, 1988, "Xanthan Gum, Natural Biogum for Scientific Water Control", 3rd Ed., Merck & Co., Inc., Rahway, N.J., p. 10.

*Primary Examiner*—Carolyn Paden
*Attorney, Agent, or Firm*—Merchant, Gould, Smith, Edell, Welter & Schmidt

[57] ABSTRACT

A low-fat dry mix, ready-to-use batter and baked composition are disclosed which are composed of a sweetened, cereal-grain ingredient base with a fat mimetic system of polydextrose, cellulosic material, non-fat milk solid or substitute, emulsifier, modified food starch, and a mixture of xanthan gum and guar or locust bean gum, preferably with lecithin and whey protein concentrate. The baked composition is moist, tender, crumbly with good mouthfeel but preferably contains, one-third fewer calories than a similar full-fatted composition.

4 Claims, No Drawings

LOW-FAT CEREAL-GRAIN FOOD COMPOSITION

This application is a continuation of U.S. Ser. No. 07/722710, filed Jun. 28, 1991, which is now abandoned, which is a divisional application of U.S. Ser. No. 07/546017, filed Jun. 28, 1990, which is now abandoned.

BACKGROUND OF THE INVENTION

The present invention concerns a low-fat cereal-grain food composition that contains a fat mimetic system.

Today's lifestyle does not afford most persons with a regular opportunity to use their daily intake of calories. The quick pace of this lifestyle also demands easily prepared foods that unfortunately are often high in caloric content. Consequently, many health conscious people have begun to practice moderation in their caloric intake. A convenient means for such moderation is the consumption of foods that have a reduced caloric content.

A high portion of the calories in prepared foods and "fast" foods can be attributed to fats and shortening present. Eliminating fats and shortenings from such foods would meet the desires of those wishing to reduce their caloric intake without eliminating such foods from their diets. Fats and shortenings, however, function in prepared foods as tenderizers, preservatives, and coating materials for starch and protein granules. They also build the air cell structure of baked products and provide the desirable mouthfeel and ingredient control properties so familiar in cakes and other baked products. Baked products without fat or suitable fat substitutes often are gummy, heavy, and lack the crumb and tenderness commonly associated with cakes, cookies, muffins, and the like.

Accordingly it is an object of the invention to develop a cereal-grain based food composition that is low in fat and contains functional substitutes for some portion of the fats that otherwise would be typically present. It is a further object to employ a combination of low calorie ingredients that will function in approximately the same manner as fats and shortenings in a baked product. A further object is the development of a low-fat baked product which is tender, moist, light and exhibits a fine crumb.

SUMMARY OF THE INVENTION

These and other objects are achieved by the present invention which is directed to a dry mix for a low-fat, cereal-grain food composition, a ready-to-use batter, a baked, low-fat cereal-grain food composition and the process for producing that composition.

According to the invention, the dry mix is a combination of a sweetened cereal-grain ingredient base and a system of fat mimetic components. The system of mimetic components simulates properties like those attributable to fat and shortening in a typical baked product and acts as a substitute for a portion of assimilable fats otherwise typically present in a baked product. The system of mimetic components includes less than 0.1 to about 15 weight percent polydextrose or a buffered form thereof, less than 0.1 to about 15 weight percent of a cellulosic material, less than 0.1 to about 8 weight percent non-fat milk solids or milk substitutes, less than 0.1 to about 4 weight percent emulsifier, less than 0.1 to about 4 weight percent modified food starch and less than 0.1 to about 2 weight percent of a mixture of xanthan gum and guar or locust bean gum, the weight percentages being relative to the total weight of the dry mix. The dry mix may further include eggs, and egg-like substance, or any combination thereof. A preferred dry mix contains less than 0.1 to about 4 weight percent lecithin, less than 0.1 to about 4 weight percent of whey protein derivative, and/or less than 0.1 to about 4 weight percent of egg albumen, the weight percentages being relative to the total weight of the dry mix. The dry mix base preferably includes about 27 to about 48 weight percent sugar and about 19 to 37 weight percent flour. Additional preferred ingredients include leavening, flavoring and coloring.

The wet mix is produced by combining the foregoing dry mix or the preferred dry mix combinations at least with water and preferably whipping the resulting wet mix to further incorporate air. Preferably, the wet mix also contains any combination of leavening, flavoring, coloring, and eggs and/or egg-like substances such as egg substitutes, egg whites or systems that simulate eggs and/or the functional properties of eggs and mixtures thereof. Especially preferred are cholesterol-free egg-like substances. The wet mix with or without the preferred additional ingredients can be prepared and maintained as a ready-to-use batter or dough. It can be packaged in a convenient ready-to-use form and preferably is stored in refrigerated or frozen form.

The baked food composition is produced by heating the wet mix under ambient conditions to cause baking. In particular, the wet mix is then heated until it rises and sets to a shape retaining structure with small air cells through out its solid volume.

According to the invention, the baked food composition is tender, moist and has small air cells substantially evenly distributed throughout. The baked food composition is a low-fat, leavened, moist, sweetened cereal-grain baked product base in combination with the foregoing system of fat mimetic components in approximately the percentages mentioned above. Chemical leavening, optional flavoring, optional coloring, optional eggs and/or egg-like substances, and a moistening amount of water are also preferred in the baked composition. Preferable amounts of sugar and flour in the baked product base are about 27 to 48 weight percent sugar and about 19 to 37 weight percent flour.

DETAILED DESCRIPTION OF THE INVENTION

Reduction of the caloric content normally present in a food can be accomplished by incorporating more air or water, replacing protein and/or carbohydrate with lower-calorie bulking agents or replacing fat with lower-calorie fat simulation systems. In developing reduced calorie versions of traditional foods, the replacement of fat causes the most dramatic decrease in calories. The creation of a low-fat, reduced calorie version of a traditionally high calorie food, while retaining the sensory characteristics of the original, presents the food scientist with a great challenge. Fat and shortening generate taste and mouth-feel properties of the food product that are not readily simulated by other ingredients.

The present composition meets this challenge by replacing the fat and shortening commonly added to cereal-grain based baked goods including but not limited to cakes, muffins, and brownies with a fat mimetic system of ingredients that provides lower caloric density. The present invention contemplates a low-fat dry mix and a corresponding low-fat baked composition having preferably one-third calories relative to a full-fatted product. The baked composition of the present invention has a volume, a fine uniform cell structure, a moisture retention, a tenderness, a taste, and a satiety that compare favorably with its full fat, full calorie counterpart.

The present invention utilizes ingredients commonly available and recognized as safe to the food industry. It is the combination of these ingredients, within a range of use levels, especially those comprising the fat mimetic system that enables creation of the baked product without fat or shortening.

Generally, the low-fat dry mix, ready-to-use batter and baked food compositions of the present invention include a sweetened, cereal-grain ingredient base with the fat mimetic system described above. The ready-to-use batter and baked composition additionally may contain optional chemical leavening, optional flavor, optional color and optional egg and/or egg-like substance. Preferably when an egg-like substance is used, lecithin is also included. Whey protein concentrate and egg albumen are also preferred ingredients.

The dry mix and ready-to-use batter or dough may be packaged in convenient forms for use by the consumer or commercial baker. Typically, the dry mix would be combined with the optional ingredients described above to form a wet mix, e.g. a batter, and then baked to produce the baked composition. The ready-to-use batter or dough preferably would include those optional ingredients and would be maintained in refrigerated or frozen condition until use by the consumer or commercial baker.

The baked low-fat food composition can be prepared from the dry mix or the ready-to-use batter or dough by the consumer or commercial baker. Baking pursuant to procedures and conditions known in the art produces the commercial or consumer baked composition. Optionally, the baked composition may be frozen by the commercial baker or consumer so that consumption of a "fresh" product after periods of storage can take place. The advantages of the baked low-fat food composition of the present invention include a tender mouthfeel, moistness simulating that of a full fatted baked product, lack of gumminess, uniformly distributed fine air cells and attractive flavor profiles even though fat and/or shortening are not present.

Properties Attributable to Fats and Shortening

Cakes and other similar baked desserts are, in their batter form, basically a sol. Sugars and other soluble ingredients are in solution and insoluble components such as proteins, fat and air are dispersed in the continuous aqueous phase. Although it is not intended that the following description should limit the present invention, fat, in the form of shortening, is believed to perform the following basic functions in baked products.

1) Shortening entraps air during the creaming process to produce a cake with proper volume, grain and texture. It is generally believed that the incorporation of air into a full-fatted baked product is primarily a function of the shortening. The fat entraps air in the form of small cells or bubbles. These cells then act as nuclei for the accumulation of water vapor and carbon dioxide (from chemical leavening agents) released during baking resulting in their expansion and subsequently increased cake volume. As the heat sets the protein in the continuous phase, a firm matrix is formed to permanently entrap the air bubbles and form the characteristic crumb.

Deficiency in air incorporation, which can be caused by fat elimination, can be overcome by using baking powder or other leavening agents. However, the release of carbon dioxide gas during baking has been shown to form few new air cells and these cakes will have a coarse grain with large air pockets. There is still a need to create many, small air cells during the mixing stage so as to create a fine, uniform grain in the baked product. The batter must be of sufficient viscosity (another fat generated property) to suspend the air bubbles as they increase in size and buoyancy.

2) Shortening also has a tenderizing effect and imparts a distinct "shortness" to the crumb structure. Fat coats the starch and gluten molecules with a film of fat thereby preventing formation of a continuous, three-dimensional gluten matrix with its inherent toughness.

3) Shortening emulsifies large amounts of liquid that contribute to moistness of the crumb and tenderness of the finished product.

4) Shortening improves the overall palatability of baked goods. There is a satiety value of fat in all foods.

5) Shortening extends the shelf life of baked goods by decreasing staling which, in addition to starch retrogradation, can be defined as a loss of moisture, tenderness and flavor.

6) Shortening adds flavor and sometimes color depending upon the source.

The Fat Mimetic System of the Present Invention

Although not intended as a limitation of the present invention, it is believed that the air incorporating function of fat is accomplished at least in part by the invention by the formation and stabilization of a foam and/or incorporation of emulsifier components, gums and lecithin. Foam is also developed in the present invention by whipping action upon the proteins in the egg and/or egg-like substances and the milk solids or substitutes. Also because foaming action is pH dependent, the pH of the composition batter is controlled within a given range.

The ability of a liquid to form a foam depends upon its viscosity and the air-liquid interfacial tension. Whipping causes partial denaturation of the proteins at the air-liquid interface and gives structural strength to the air cell walls, thus decreasing interfacial tension. Viscosity of the batter or wet mix of the present invention is determined by all dissolved solutes and can be adjusted with the guar, xanthan, locust bean gum, cellulosic material, milk solids or substitutes, whey protein derivatives and modified food starch. The sugar source used also affects the viscosity and air-liquid interfacial tension. Sucrose is optimum from a flavor quality and functional standpoint but it can be replaced either partially or totally with fructose with little sacrifice in total quality of the finished product.

The polar glycolipids and phospholipids naturally occurring in both flour and fats promote the formation of fine, uniform gas cells of high stability. According to the invention, the cellulosic material, gums, milk solids or substitutes, modified food starch and emulsifier at least in part are believed to significantly enhance the incorporation of air and air cell stabilization as a simulation of the effects of such glyco/phospholipids.

Although not intended to be a limitation of the present invention, the tenderizing effect of shortening is believed to be simulated by a variety of ingredients according to the present invention. The cellulosic material, gums, and emulsifier components are believed to complex with the protein and starch portions of the cereal flour and other ingredients to form lamellar structures and disrupt formation of a gluten-gluten and gluten-starch matrix and thus exert a tenderizing effect. The gum and surfactant (emulsifier) molecules may combine with gluten proteins to form electrostatic and/or hydrogen bonds and/or they can interact with the gluten to form lamellar-like structures. These bimolecular lipid layers can associate with polar and non-polar surfaces of protein aggregates and further stabilize air-water interfaces.

The cellulosic material, gums, lecithin and emulsifier components also have, in part, a crumb softening effect according to the invention. They are believed to form starch-complexes which result in a soft crumb in the freshly baked product and a decreased rate of staling. Linear starch molecules (amylose) form stable complexes around the emulsifier components, gums and the like and become largely insoluble in water. These complexes prevent migration of the amylose from the granules and formation of an external gel structure. The resultant crumbs lack elasticity and are softer and more tender. Branched starch molecules (amylopectin) are not effected by the emulsifier and undergo their normal gel structure formation giving some firmness to the crumb.

The moistness and tenderizing effects of the emulsification of large amounts of water by shortening are believed to be simulated according to the present invention by a combination of non-fat milk solids or substitutes, modified food starch, polydextrose, lecithin, cellulosic material, emulsifier components and guar or locust bean and xanthan gums.

The satiety and palatability of fat are believed to be simulated according to the present invention by a combination of non-fat milk solids or substitutes, modified food starch, polydextrose, lecithin, cellulosic material, guar, locust bean and xanthan gums, and emulsifier components.

According to the present invention, the interaction of emulsifier components, lecithin and/or gums with the amylose fraction of the starch, and adsorption of amylose onto added cellulosic materials and polydextrose retard the staling process. Moisture retention by non-fat milk solids or substitutes, polydextrose, cellulosic material, and the gums also serves to slow the gradual loss of quality over time resulting from moisture and flavor loss. The emulsifier components also contribute to moisture transfer at various stages in the life of a baked product.

The contribution of flavor and color to cakes, or other baked goods, by shortening is replaced by the addition of commercially available flavors and colors according to the present invention.

INGREDIENT DESCRIPTIONS

Sugar

Sugar has a tenderizing effect in baked goods which is one of the reasons why sweet goods are more tender than basic bread. Sugar contributes to tenderness, flavor, and to moisture retention in direct correlation with its concentration. Traditionally, cakes have been made with equal concentrations of flour and sugar, but high-ratio cakes are becoming common today because of their moist, tender, and fine grained crumb. As the sugar concentration is increased in a no-fat, reduced calorie cake, the volume decreases slightly, while tenderness and flavor are improved. To counteract flatness and enable addition of more sugar and liquid, emulsifier components, guar or locust bean gum, xanthan gum, lecithin, whey protein derivatives, and optional egg albumen are incorporated into the dry mix, ready-to-use batter and baked composition according to the invention. The weight of flour relative to sugar can be anywhere in the range of 1:1.0 to 1:2.0. The preferred flour to sugar ratio is about 1.0:1.3.

The inversion of glucose to fructose occurs during the baking process. Fructose in the finished product contributes to moistness and, due to its hygroscopicity, to moisture retention over time. Higher initial sugar concentrations result in greater moisture retention.

Fructose can be substituted either totally or partially for the sucrose. Fructose is added to enhance sweetness and give a higher sweetness intensity at lower total levels of "sugars" added. Thus, the sweetness intensity of a high ratio cake at a lower ratio of flour to sugar can be created. The upper limit of fructose which can be added is dictated by the residual sweetness perception and the browning that occurs externally and internally in the cake from the Maillaird (carbonyl-amine) reaction. Fructose is also very hygroscopic and increases the moistness of the cake initially and over time. An 85:15 ratio of sucrose:fructose is optimum for flavor, browning, and hygroscopic characteristics. The amount of sugar to flour can then be varied to create the desired texture and sweetness.

Polydextrose

According to the present invention, polydextrose (such as Polydextrose K manufactured by Pfizer, Inc., New York, N.Y.) is added to replace fat and is believed to have a tenderizing effect on the baked composition. It is also valuable in partial replacement of sugar on a functional level. A further use is as a low calorie bulking agent.

Polydextrose is very hygroscopic and functions as an humectant to prevent dehydration of the cake over time. Polydextrose and the products in which it is used reach an equilibrium with the surrounding environment. It has been observed that depending upon the ambient relative humidity, a cake made according to the present invention may be moister after sitting for several hours at room or refrigeration temperatures than when fresh out of the oven.

Polydextrose also functions as a low calorie bulking agent. It decreases the caloric density of a food because it is only partially metabolized. The caloric utilization of polydextrose is about 1 Calorie per gram. Most of the polydextrose passes through the body unabsorbed.

It is advantageous to use low caloric polydextrose to replace as much high caloric fat, sugar, and flour as possible. Levels significantly above 15% total weight of the finished product, however, begin to cause deterioration in the eating qualities aid appearance of the finished baked good.

Non-fat Milk Solids or Substitutes

Non-fat milk solids or substitutes form part of the compositions of the present invention. Examples of non-fat milk solids and substitutes include milk protein, casein, whey ;protein, whey protein concentrates, soy milk, soy protein, soy protein concentrates, egg protein, milk replacers and the like. They are good foaming agents and aid in the incorporation of air creating small air cell size and good foam stability. At low levels of addition, the amount of air incorporation is decreased, while at high levels, too much "strength" is incorporated and the baked goods become tough. Non-fat milk solids or substitutes contribute to air cell size, foam stability and emulsification in cake batters, improve grain and crust color, and decrease moisture loss during baking. The desired final product volume and texture can thus be achieved by an effective concentration of non-fat dry milk solids or substitutes.

The casein or other milk protein fraction increases the moisture absorbing capacity of the batter thereby creating a higher moisture content in the finished product and decreased firming during storage. Non-fat milk solids or substitutes contribute to surface browning (crust color) by providing reactants for the carbonyl-amine (Maillaird) browning reaction. Flavor components are also contributed by non-fat milk solids or substitutes. Both high heat and low heat non-fat milk solids or substitutes perform well in the present invention.

Modified Food Starch

The addition of a starch component increases moisture retention and provides a fine grain. Starch increases batter viscosity which aids in the retention of air cells. According to the invention the modified food starch is any pregelatinized starch or derivative that generates high viscosity in water and begins to thicken as soon as it comes into contact with water. Moisture is retained throughout the baking cycle in the hydrated starch granules. Pregelatinized starches which swell in cold water are preferred in order to avoid the need to fully hydrate uncooked starch granules.

Cellulosic Material

Cellulosic material is added to the low-fat composition of the present invention as a foam stabilizer, to increase moisture retention, and as a bulking agent. According to the invention any prepared cellulosic material that will hydrate upon mixing with water without high shear is included. Examples include microcrystalline cellulose, powdered cellulose, and carboxymethyl cellulose with microcrystalline cellulose. When combined into the present compositions, a network of cellulose fibers forms in the aqueous phase to create a physical barrier in which air cells are entrapped. This network is not disrupted by baking temperatures. Further, the cellulosic material absorbs water for increased moisture retention in the freshly baked product and during storage. Adsorption of amylose onto the surface of the cellulosic material may also enhance initial tenderness and decrease the rate of staling.

Emulsifiers

According to the present invention, the emulsifier components, contribute a portion of the functionality usually associated with shortening. The emulsifier components are composed of any one or a combination of nonionic, anionic and/or cationic surfactants and/or emulsifying compounds that are suitable for food grade use. A preferred embodiment is a combination of such components designed to incorporate such properties as aeration, emulsification ability, non-staling and textural attributes (tenderness, moistness, crumb structure and the like). Not every component of the combination need have all such properties but rather the combination preferably displays them to some degree. A mixture of propylene glycol mono- and diesters of fatty acids plus mono- and diglycerides and lecithin are especially effective as a combination of emulsifier components while single mono- and diglycerides are also very acceptable.

Emulsifiers aid in the incorporation of air into the batter and its retention. They also have an effect on the extent of subdivision of the air cells. The foam structure of the batter has an effect on the final grain and volume of the baked product. It is also believed to have an effect on moistness in that with many, smaller air cells there is increased surface area onto which water vapor can be absorbed.

Emulsifiers, especially monoglycerides, retard staling of baked products by decreasing the binding between gelatinized starch granules. The decreased binding also gives a looser crumb in the finished product. Monoglycerides and other surfactants also have an effect on moisture transfer at various stages in the life of the baked product.

Mono- and diglycerides, propylene glycol mono- and diesters of fatty acids, glyceryl-lacto esters of fatty acids, ethoxylated mono- and diglycerides, lecithin or equivalents thereof, or a mixture of these, are appropriate for the compositions of the invention. The demonstrated formulations use a mixture determined to yield optimal volume, cell structure, moistness and tenderness.

Guar and Xanthan Gums

In baked goods, guar, locust bean gum and xanthan gum function to increase finished moisture content, increase volume, improve crumb texture, give batter rheology control, air cell stabilization and recipe tolerance. Xanthan gum and guar or locust bean gums work in combination with starch to thicken and stabilize the microstructure of small air cells within the batter. This effect contributes to a fine, evenly grained baked product. Xanthan and guar or locust bean also contribute to a more tender cake and increased moisture retention by binding moisture. These hydrocolloids thus have an effect on the finished eating quality with regard to moistness, structure and volume of the finished product.

Xanthan works in synergy with guar gum or locust bean gum to enhance those properties listed above. Gum use levels of 0.1 to 1.0 weight percent of each result in acceptable baked goods with the finished products becoming tougher, more spongy and gummy in texture at significantly higher levels of addition. Preferred use levels are in the range of 0.1 to 0.3 weight percent for xanthan and for guar or locust bean gum.

Leavening Agents

The exact leavening system used in the present invention constitutes any that will provide adequate rising power in the reduced calorie formulation. A simple combination of baking soda, baking powder, and glucono-delta-lactone is acceptable. This system can easily be replaced with other more complex combinations of leavening agents. Another more complex system typically used in commercially prepared dry mixes for baked goods is the combination of soda, sodium aluminum phosphate and mono- and dicalcium phosphates.

The pH of the batter is determined to some degree by the leavening system. Consequently, the leavening system through control of pH has an effect on the functionality of the ingredients and how they interact to create a fat mimetic system. An appropriate pH range for non-chocolate batters is 6.6 to 7.0 with a preferred range of 6.7 to 6.9. An appropriate pH range for chocolate batters is 7.0 to 7.5 with a preferred range of 7.2-7.4. The color and texture of a baked product is determined by its pH and will vary by product.

EXAMPLES

The following examples further illustrate the invention. They are not meant to constitute implied limitations of the scope which is fully set forth in the foregoing text.

EXAMPLE 1

Preparation of Cake

Protocol

The cake formulations make two 8" rounds, two 9" rounds, or one 13"×9"×2" rectangular.

Heat oven to 350° F.

Spray pans lightly with food release spray.

Weigh and thoroughly blend together the dry ingredients.

Weigh or measure the eggs or egg whites and water and add this mixture to the dry ingredients.

Blend at low speed until the dry ingredients are thoroughly wetted.

Mix on a medium to high speed (3 on a mixer with 4 speeds or 6 on a mixer with 10 speeds) for 2-3 minutes.

Pour batter into prepared pans.

Bake at 350° F. for 25-35 minutes for layer cakes and 30-40 minutes for 13"×9"×2" or until cake springs back when touched lightly in the center.

Cool on cake rack before removing from pan.

The protocol is utilized with the following yellow and chocolate cake mixes.

| Low-fat, Reduced Calorie Yellow Cake Mix Formulation | | | |
|---|---|---|---|
| | Dry Mix | Total Cake | |
| Ingredient | wt-% | wt-% | grams |
| Dry Mix | | | |
| Sugar | 39.95 | 21.4-23.0 | 207.7 |
| Flour | 30.73 | 16.5-17.7 | 160.0 |
| Polydextrose | 12.75 | 6.8-7.3 | 66.3 |
| Non-fat Milk Solids | 3.73 | 2.0-2.2 | 19.4 |
| Baking Powder/Leavener | 2.59 | 1.4-1.5 | 13.5 |
| Cellulose | 2.19 | 1.2-1.3 | 11.4 |
| Emulsifier | 1.88 | 1.0-1.1 | 9.8 |
| Whey Protein | 1.70 | 0.9-1.0 | 8.8 |
| Modified Food Starch | 1.50 | 0.8-0.9 | 7.8 |
| Flavor | 0.84 | 0.4-0.5 | 4.4 |
| Lecithin | 0.80 | 0.4-0.5 | 4.2 |
| Sodium Chloride | 0.63 | 0.3-0.4 | 3.3 |
| Guar Gum | 0.37 | 0.1-0.2 | 1.9 |
| Xanthan Gum | 0.19 | 0.10-0.11 | 1.0 |
| Color | 0.15 | 0.08-0.09 | 0.8 |
| Total Dry Mix | 100.00 | | 520.3 |
| Liquid Additions | | | |
| Eggs, Whole or White | 3 count | 11.0-17.2 | 99-167 |
| Water | 1¼ cups | 29.3-31.5 | 284 |
| Total Batter | | 98.1-101.5 | 903-971 |

| Low-fat, Reduced Calorie Chocolate Cake Mix Formulation | | | |
|---|---|---|---|
| | Dry Mix | Total Cake | |
| Ingredient | wt-% | wt-% | grams |
| Dry Mix | | | |
| Sugar | 39.23 | 20.6-22.1 | 203.8 |
| Flour | 25.69 | 13.5-14.5 | 133.5 |
| Polydextrose | 12.12 | 6.4-6.8 | 63.0 |
| Cocoa | 5.31 | 2.8-3.0 | 27.6 |
| Non-fat Milk Solids | 3.56 | 1.9-2.0 | 18.5 |
| Baking Powder/Leavener | 3.35 | 1.8-1.9 | 17.4 |
| Whey Protein | 2.41 | 1.3-1.4 | 12.5 |
| Cellulose | 2.08 | 1.1-1.2 | 10.8 |
| Emulsifier | 1.79 | 0.9-1.0 | 9.3 |
| Modified Food Starch | 1.42 | 0.75-0.80 | 7.4 |
| Lecithin | 0.81 | 0.42-0.45 | 4.2 |
| Sodium Chloride | 0.69 | 0.36-0.39 | 3.6 |
| Albumen | 0.50 | 0.26-0.28 | 2.6 |
| Vanilla Flavor | 0.42 | 0.22-0.24 | 2.2 |
| Guar Gum | 0.35 | 0.18-0.20 | 1.8 |
| Xanthan Gum | 0.17 | 0.09 0.10 | 0.9 |
| Butter Flavor | 0.10 | 0.05-0.06 | 0.5 |
| Total Dry Mix | 100.00 | | 519.6 |
| Liquid Additions | | | |
| Eggs, Whole or White | 3 count | 10.8-16.9 | 99-167 |
| Water | 1¼ cups | 30.5-32.8 | 302 |
| Total Batter | | 97.7-100.7 | 921-989 |

EXAMPLE 2

Preparation of Muffins

Protocol

Heat oven to 350° F.

Spray muffin pans lightly with food release spray or line with paper cups.

Weight and thoroughly blend together the dry ingredients.

Weigh or measure the eggs and water and add to the dry ingredients.

Blend on the lowest speed until the dry ingredients are thoroughly wetted.

Mix on a medium to high speed (3 on a mixer with 4 speeds or 6 on a mixer with 10 speeds) for 2 minutes or by hand for 50 strokes.

For blueberry muffins add the blueberries at this point and gently stir into the batter.

Pour batter into prepared pans.

Bake at 400° F. for 17-19 minutes or until the muffin springs back when touched lightly in the center.

Cool slightly before removing from the pan.

The protocol is utilized with the following blueberry and bran muffin mixes.

| Low-fat, Reduced Calorie Blueberry Cake Mix Formulation | | | |
|---|---|---|---|
| | Dry Mix | Total Cake | |
| Ingredient | wt-% | wt-% | grams |
| Dry Mix | | | |
| Sugar | 38.03 | 22.6-23.3 | 300.4 |
| Flour | 33.79 | 19.8-20.4 | 266.9 |
| Polydextrose | 11.09 | 6.5-6.7 | 87.6 |
| Non-fat Milk Solids | 6.84 | 4.0-4.1 | 54.0 |
| Baking Powder/Leavener | 2.28 | 1.3-1.4 | 18.0 |
| Cellulose | 1.72 | 1.00-1.03 | 13.6 |
| Emulsifier | 1.52 | 0.88-0.91 | 12.0 |
| Modified Food Starch | 1.52 | 0.88-0.91 | 12.0 |
| Lecithin | 1.00 | 0.58-0.60 | 7.9 |
| Whey Protein | 1.00 | 0.58-0.60 | 7.9 |
| Sodium Chloride | 0.53 | 0.31-0.32 | 4.2 |
| Guar Gum | 0.30 | 0.17-0.18 | 2.4 |
| Flavor | 0.23 | 0.13-0.14 | 1.8 |
| Xanthan Gum | 0.15 | 0.08-0.09 | 1.2 |
| Total Dry Mix | 100.00 | | 789.9 |
| Liquid Additions | | | |
| Eggs, Whole or White | 4 or 8 count | 17.0-19.5 | 223-264 |
| Water | 1¼ cups | 22.3-23.0 | 302 |
| Total Batter | | 99.99 | 1315-1356 |
| Fruit | | | |
| Blueberries | Wild or domestic, fresh, canned, or frozen, add more or less as desired. | | 180 g |

YIELDS 24 muffins with a 60 gram pour in a 2" muffin cup

-continued

Low-fat, Reduced Calorie Bran Muffin Mix Formulation

| Ingredient | Dry Mix wt-% | Total Cake wt-% | Total Cake grams |
|---|---|---|---|
| Dry Mix | | | |
| Sugar | 30.00 | 17.5–18.2 | 243.0 |
| Flour | 22.95 | 13.4–13.8 | 185.7 |
| Wheat Bran | 18.29 | 10.7–11.0 | 148.0 |
| Polydextrose | 10.82 | 6.3–6.5 | 87.6 |
| Non-fat Milk Solids | 6.67 | 3.9–4.0 | 54.0 |
| Baking Powder/Leavener | 2.47 | 1.4–1.5 | 20.0 |
| Cellulose | 1.68 | 0.98–1.01 | 13.6 |
| Emulsifier | 1.48 | 0.86–0.89 | 12.0 |
| Modified Food Starch | 1.48 | 0.86–0.89 | 12.0 |
| Lecithin | 1.00 | 0.58–0.60 | 8.1 |
| Whey Protein | 1.00 | 0.58–0.60 | 8.1 |
| Cinnamon | 0.74 | 0.43–0.44 | 6.0 |
| Sodium Chloride | 0.52 | 0.30–0.31 | 4.2 |
| Flavors | 0.45 | 0.26–0.27 | 3.6 |
| Guar Gum | 0.30 | 0.17–0.18 | 2.4 |
| Xanthan Gum | 0.15 | 0.08–0.09 | 1.2 |
| Total Dry Mix | 100.00 | | 809.5 |
| Liquid Additions | | | |
| Eggs, Whole or Whites | 4–8 count | 16.6–19.1 | 223–264 |
| Water | 1⅜ cups | 22.5–23.2 | 312 |
| Total Batter | | 99.9–100.1 | 1344–1386 |

YIELDS 19 muffins with a 70 gram pour in a 2" muffin cup

EXAMPLE 3

Yellow Cake Taste Panel Test

Test

The yellow cake (YC) was tested in a subjective taste panel test (n×30) versus other known low-fat cake formulas and Pillsbury Plus Yellow Cake (TPC plus, full fatted cake). All low-fat cakes contained the same color and flavor system, did not have shortening or oil, but some did contain emulsifiers. All cakes were made with whole eggs except where noted. Moistness, texture, and flavor liking were rated on a 7 point scale and overall acceptability was rated on a 9 point scale. The cake height was measured in inches. The samples were:

| YC-whole egg | low-fat cake formula similar to Example 1, with whole egg |
| YC-egg white | low-fat cake formula similar to Example 1, with egg white |
| TPC Plus | current full-fatted formula out in the market |
| Pfizer | published low-fat formula by Pfizer using Polydextrose |
| National | published low-fat formula by National Starch using N-flate |
| Durkee | published low-fat formula by Durkee using Dur-Lo |

Table 1 provides a comparison of the ingredient formulations of these cakes.

Results:

| | Moistness (dry-->moist) | | Texture (dislike-->like) |
|---|---|---|---|
| YC-whole egg | 4.2 a | TPC Plus | 6.0 a |
| | | YC-whole egg | 4.7 b |
| TPC Plus | 3.9 b | YC-egg white | 3.5 c |
| YC-egg white | 3.1 c | National | 3.0 d |
| National | 2.3 d | Pfizer | 3.0 d |
| Pfizer | 2.3 d | Durkee | 1.7 e |
| Durkee | 1.2 e | | |
| Flavor | | Overall Liking | |

Results:

| | (dislike-->like) | | (dislike-->like) |
|---|---|---|---|
| TPC Plus | 5.8 a | TPC Plus | 7.2 a |
| YC-whole egg | 4.7 b | YC-whole egg | 5.4 b |
| | | YC-egg white | 4.6 c |
| YC-egg white | 4.5 bc | National | 3.9 d |
| National | 4.2 c | Pfizer | 3.3 e |
| Pfizer | 3.6 d | Durkee | 1.4 f |
| Durkee | 2.3 e | | |
| Cake Height (inches) | | | |
| YC-whole egg | 1.86 | | |
| TPC Plus | 1.76 | | |
| YC-egg white | 1.74 | | |
| National | 1.71 | | |
| Pfizer | 1.69 | | |
| Durkee | 1.59 | | |

(Means having the same letters do not differ significantly at alpha = 0.05).

In summary, the results of the taste panel test indicated that:

(a) YC appears to be superior to other published low-fat cake formulas in overall liking, moistness, texture, and flavor.

(b) YC with whole egg is moister than a Pillsbury Plus cake (a fully fatted cake).

TABLE 1

Comparison of YC to Already Published Low-Fat Caka Formulas

| wt-% of Dry Mix Ingredient | YC | National | Pfizer | Durkee |
|---|---|---|---|---|
| Sugar | 39.05 | 45.00 | 34.00 | 46.98 |
| Flour | 31.42 | 40.00 | 40.17 | 39.07 |
| Polydextrose | 12.75 | | 13.01 | |
| Non-fat Milk Solid | 3.73 | | 3.81 | 3.90 |
| Baking Powder | 2.59 | 3.40 | 3.40 | 2.32 |
| Cellulose | 2.19 | | | |
| Emulsifier | 1.88 | | 1.91 | 6.19 |
| Mod. Food Starch | 1.50 | | 1.52 | |
| Salt | 0.63 | 0.65 | 0.65 | 1.24 |
| GDL | | | 0.37 | |
| Guar Gum | 0.37 | | 0.35 | |
| Soda | | | 0.30 | |
| Xanthan Gum | 0.19 | | 0.19 | |
| Flavor/Color | 1.00 | 0.45 | 0.32 | 0.30 |
| Albumen | | | | |
| N-flate | | 7.60 | | |
| Egg Solids | | 0.40 | | |
| Dextrose | | 2.50 | | |
| Whey Protein Conc. | 1.70 | | | |
| Lecithin | 1.00 | | | |
| TOTAL | 100.00 | 100.00 | 100.00 | 100.00 |

| Published Pfizer Yellow Cake Preparation* | |
|---|---|
| | Wt-% |
| Part A. Ingredients | |
| Sugar, Granulated | 18.29 |
| Polydextrose | 7.00 |
| Non-Fat Milk Solids | 2.05 |
| Polyglycerol Monoesters and Mono- and Diglycerides | 1.03 |
| Food Starch Modified (National Starch) | 0.82 |
| Guar Gum (National Starch) | 0.19 |
| Sodium Bicarbonate | 0.16 |
| Artificial Butter Concentrate | 0.08 |
| (Consumers Flavoring Extract Co.) | |
| Artificial Vanilla Flavor (610072U-PFW) | 0.08 |
| Part B. Ingredients: | |
| Cake Flour | 21.61 |
| Baking Powder | 1.83 |
| Glucono-delta-lactone (Pfizer) | 0.20 |
| Salt | 0.35 |
| Xanthan Gum | 0.10 |

-continued

Part C. Ingredients:
| | |
|---|---|
| Whole Eggs | 17.77 |
| Water | 14.22 |
| Part D. Ingredients | |
| Water | 14.22 |

Procedure
1. Mix Part A.
2. Slowly add Part B and mix.
3. Add Part C. mix, scrape down.
4. Mix until smooth.
5. Add Part D. mix until smooth.
6. Scale 13 oz. into eight-inch cake pan (greased or paper lined.)
7. Bake at 350° F.for 30 minutes.

*From "Pfizer Polydextrose for the Market That's Shaping Up, 1985."

National N-Flate Yellow Cake*
Formula:
The following starting formula outlines the use of N-Flate in a cake mix.

Shortening Free Yellow Cake Mix

| Ingredients: | Wt-% |
|---|---|
| Sugar | 45.0 |
| Cake Flour | 40.0 |
| N-Flate | 7.6 |
| Leavening Agent | 3.4 |
| Dextrose | 2.5 |
| Salt | 0.5 |
| Whole egg, Solids | 0.4 |

Recommended Color: Atlene Medium Egg Shade Yellow from H. Kohnstamm at 0.016 g/kg.

Procedure:
1. Dry blend ingredients to uniformity.
2. To each pound of cake mix, add 240 mls of water and 150 g of eggs.
3. Beat on low speed of mixer for 30 seconds.
4. Beat on high speed for 3.5 minutes. Batter will be heavy and very fluffy.
5. Pour batter into a greased and floured baking pan.
6. Bake at 350° F. (177° C.) for 28 min.

*From National Starch N-Flate Bulletin 19483.

Durkee Dur-Lo Yellow Cake*

| Ingredients | Fat Reduced Cake wt-% |
|---|---|
| Dur-lo | 4.00 |
| Flour | 25.26 |
| Sugar | 30.37 |
| Milk Solids | 2.52 |
| Salt | 0.80 |
| Baking Powder | 1.50 |
| Water | 11.37 |
| Whole Eggs | 12.61 |
| Water | 11.37 |
| Vanilla | 0.20 |
| | 100.00 |

Procedure:
1. Mix dry ingredients and Dur-Lo together on low speed for ½ minute.
2. Add first water and mix on medium speed for 4 minutes. Scrape bowl.
3. Blend eggs in slowly on low speed.
4. Mix on medium speed for 3 minutes. Scrape bowl.
5. Blend second water and vanilla slowly on low speed.
6. Mix on low speed for 4 minutes.

*From Product Data Sheet "Dur-Lo Mono-and Diglyceride Emulsifier for Fat-Reduced Foods" IND-306C.

The invention has been described with reference to various specific and preferred embodiments and techniques. However, it should be understood that many variations and modifications may be made while remaining within the spirit and scope of the invention.

I claim:

1. In a low-fat dry mix of a sweetened cereal-grain ingredient base with a fat mimetic system of about 0.1 to about 15 weight percent of a polydextrose or a buffered form thereof, about 0.1 to about 15 weight percent of a cellulosic material, about 0.1 to 8 weight percent of a non-fat milk solid or substitute, about 0.1 to about 4 weight percent each of an emulsifier and a modified food starch, about 0.1 to about 2 weight percent of a mixture of xanthan gum and guar or locust bean gum, wherein the weight percentages are relative to the total weight of the dry mix, the improvement which comprises:

addition of a combination of about 0.1 to 4 weight percent each of lecithin and high heat whey protein to the sweetened cereal-grain ingredient base, the combination simulating the functional properties of eggs, the lecithin being different from the emulsifier and the high heat whey protein being different from the non-fat milk solid or substitute; and the improved dry mix being capable of producing a moist and tender baked composition with substantially homogeneously distributed small air cells throughout the volume of the baked composition.

2. A dry mix according to claim 1 further comprising flavoring, coloring, salt, leavening, preservatives or any combination thereof.

3. In a baked, low-fat food composition of a baked, sweetened cereal-grain product base with a fat mimetic system of about 0.1 to about 15 weight percent of a polydextrose or a buffered form thereof, about 0.1 to about 15 weight percent of a cellulosic material, about 0.1 to about 8 weight percent of a non-fat milk solid or substitute, about 0.1 to about 4 weight percent each of an emulsifier and a modified food starch, about 0.1 to about 2.0 weight percent of a mixture xanthan gum and guar or locust bean gum wherein the weight percentages are relative to the total weight of the dry mix, the improvement which comprises:

addition of a combination of about 0.1 to 4 weight percent each of lecithin and high heat whey protein to the sweetened cereal-grain product base, the combination simulating the functional properties of eggs, the lecithin being different from the emulsifier and the high heat whey protein being different from the non-fat milk solid or substitute.

4. In a low-fat ready-to-use batter suitable for preparing a baked food composition of a moist, sweetened cereal-grain ingredient base with a fat mimetic system of components including polydextrose, cellulosic material, emulsifier, modified food starch, non-fat milk solids or substitutes, a mixture of xanthan gum and guar or locust bean gum, the improvement comprising:

addition of a combination of about 0.1 to 4 weight percent each of lecithin and high heat whey protein to the sweetened-cereal grain ingredient base, the combination simulating the functional properties of eggs, the lecithin being different from the emulsifier and the high heat whey protein being different from the non-fat milk solids or substitutes, and the weight percentages of the components in the batter being effective to provide a tender mouthfeel, moistness and uniformly distributed air cells when the batter is converted into the baked composition.

* * * * *

UNITED STATES PATENT AND TRADEMARK OFFICE
CERTIFICATE OF CORRECTION

PATENT NO. : 5,262,187

DATED : November 16, 1993

INVENTOR(S) : Patricia W. Hahn

It is certified that error appears in the above-identified patent and that said Letters Patent is hereby corrected as shown below:

Column 11, line 33, please delete "(n X 30)" and therefor --(n = 30)--.

Signed and Sealed this

Twenty-fourth Day of May, 1994

*Attest:*

BRUCE LEHMAN

*Attesting Officer*     Commissioner of Patents and Trademarks